United States Patent
Becker

(10) Patent No.: US 7,879,247 B2
(45) Date of Patent: Feb. 1, 2011

(54) BEVERAGE BOTTLING PLANT FOR FILLING BOTTLES WITH A LIQUID BEVERAGE FILLING MATERIAL, A CONTAINER FILLING PLANT CONTAINER FILLING MACHINE, AND A FILTER APPARATUS FOR FILTERING A LIQUID BEVERAGE

(75) Inventor: Hans Becker, Gensingen (DE)

(73) Assignee: KHS Maschinen-Und Anlagenbau AG, Dortmund (DE)

( * ) Notice: Subject to any disclaimer, the term of this patent is extended or adjusted under 35 U.S.C. 154(b) by 531 days.

(21) Appl. No.: 11/773,593

(22) Filed: Jul. 5, 2007

(65) Prior Publication Data

US 2008/0000847 A1 Jan. 3, 2008

Related U.S. Application Data

(62) Division of application No. 10/930,678, filed on Aug. 31, 2004, now Pat. No. 7,255,141.

(30) Foreign Application Priority Data

Sep. 2, 2003 (DE) .................................. 103 40 366

(51) Int. Cl.
 *C02F 1/00* (2006.01)
(52) U.S. Cl. ...................... 210/741; 210/106; 210/137
(58) Field of Classification Search ................ 210/193, 210/347, 332, 333.01, 334, 340, 777, 778, 210/779, 741, 106, 137
See application file for complete search history.

(56) References Cited

U.S. PATENT DOCUMENTS

| | | | |
|---|---|---|---|
| 2,322,428 A | | 6/1943 | Eickemeyer |
| 2,858,024 A | * | 10/1958 | Babcock ..................... 210/108 |
| 4,691,496 A | | 9/1987 | Anderson et al. |
| 4,865,088 A | | 9/1989 | Stearns |
| 5,069,791 A | * | 12/1991 | Becker et al. ............... 210/344 |
| 5,594,161 A | | 1/1997 | Randhahn et al. |
| 5,707,517 A | | 1/1998 | Rolchigo et al. |
| 2005/0051502 A1 | * | 3/2005 | Gottkehaskamp ........... 210/777 |

FOREIGN PATENT DOCUMENTS

| | | |
|---|---|---|
| DE | 101 24 226 | 11/2002 |
| EP | 0064795 | 11/1982 |
| EP | 0 379 054 | 7/1990 |

(Continued)

OTHER PUBLICATIONS

WO 03/008067 A1, Gottkehaskamp, "Method for using Auxiliary Filtering Agents for Filtration Purposes", Jan. 30, 2003.*

(Continued)

*Primary Examiner*—Duane Smith
*Assistant Examiner*—Paul J Durand
(74) *Attorney, Agent, or Firm*—Nils H. Ljungman & Associates

(57) ABSTRACT

A beverage bottling plant for filling bottles with a liquid beverage filling material, a container filling plant container filling machine, and a filter apparatus for filtering a liquid beverage. The filter apparatus has a plurality of filter chambers and associated valves for controlling flow of filtered liquid out of the filter chambers to optimize filtration.

3 Claims, 7 Drawing Sheets

FOREIGN PATENT DOCUMENTS

| | | |
|---|---|---|
| EP | 1 243 300 | 9/2002 |
| GB | 1 021 331 | 3/1966 |
| GB | 1 091 933 | 11/1967 |
| RU | 4924 U1 | 9/1997 |
| RU | 2139755 | 10/1999 |
| RU | 2178725 | 1/2002 |
| SU | 1761211 | 9/1992 |

OTHER PUBLICATIONS

European Patent Office Search Report EP 1 512 450 and English translation thereof.

* cited by examiner

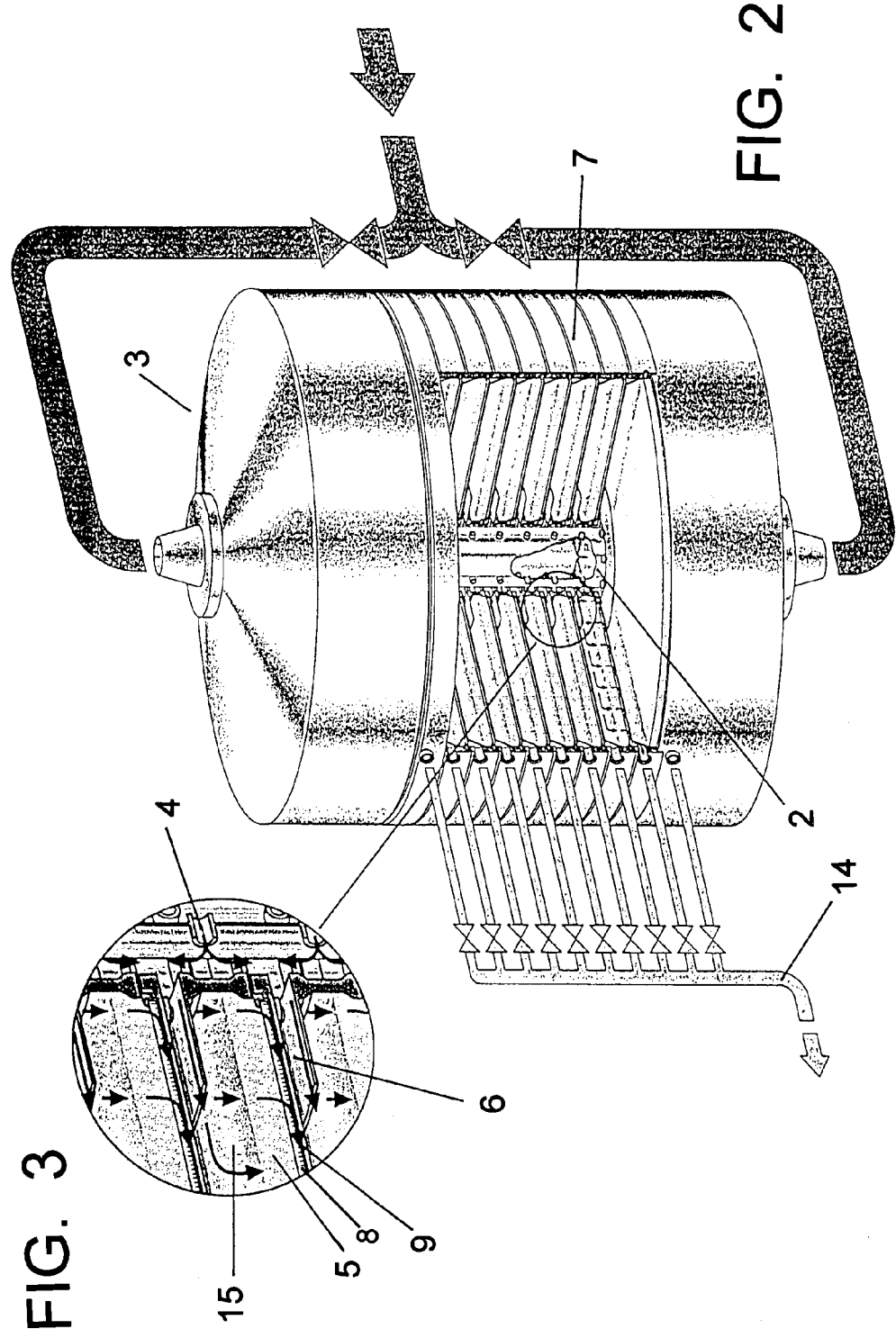

BEVERAGE BOTTLING PLANT FOR FILLING BOTTLES WITH A LIQUID BEVERAGE FILLING MATERIAL, A CONTAINER FILLING PLANT CONTAINER FILLING MACHINE, AND A FILTER APPARATUS FOR FILTERING A LIQUID BEVERAGE

This application is a divisional of pending U.S. application Ser. No. 10/930,678, filed on Aug. 31, 2004, which is claiming priority from Federal Republic of Germany Patent Application No. 103 40 366.3, filed Sep. 2, 2003.

BACKGROUND

1. Technical Field

The application relates to a beverage bottling plant for filling bottles with a liquid beverage filling material, a container filling plant container filling machine, and a filter apparatus for filtering a liquid beverage.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus being configured to introduce a predetermined volume of liquid beverage filling material into the interior of bottles to a substantially predetermined level of liquid beverage filling material, and the apparatus configured to introduce a predetermined flow of liquid beverage filling material comprising apparatus being configured to terminate the filling of beverage bottles upon liquid beverage filling material reaching said substantially predetermined level in bottles. There may also be provided a conveyer arrangement being configured and disposed to move bottles, for example, from an inspecting machine to the filling machine. Upon filling, a closing station closes filled bottles. There may further be provided a conveyer arrangement configured to transfer filled bottles from the filling machine to the closing station. Next, filled bottles are usually labeled in a labeling station after closing.

The prior art comprises numerous filter apparatus.

For example, European Patent No. EP 0 379 054 B1 describes a filter apparatus in which several circular diskshaped filter elements that are disposed essentially horizontally one above the other, with these filter elements being disposed between a bottom wall element and a top wall element, these elements together with the outer wall of the filter element configuring the outer housing or housing structure of such a filter. European Patent No. EP 0 379 054 B1, and its corresponding U.S. Pat. No. 5,069,791 issued to Becker et al. on Dec. 3, 1991 and entitled 'Filter apparatus' are hereby incorporated by reference as if set forth in their entirety herein.

Furthermore, the filter elements comprise a centrally disposed and round opening that serves, on the one hand, to provide the communication to the several filter elements and that serves, on the other hand, to provide for the introduction of the liquid to be filtered, i.e., the liquid to be filtered (unfiltrate). Each one of these filter elements comprises a separating layer that separates the chamber for the liquid to be filtered (unfiltrate) from the chamber for filtrate.

This separating layer may be formed, for example, by a slotted sieve tray, or a mesh arrangement, with such slotted sieve tray, in turn is supported on a separating plate that also forms the fluid tight separation to the next filter element that is disposed below the first-described filter element.

Among other things, for improving the filtration capacity, prior to the actual filtering, a so-called filter cake is introduced onto the separating layer by slurrying, i.e., the filter cake comprising a layer comprising filter aid.

For the purpose of flushing or, respectively, for the purpose of cleaning of such a filter apparatus, provision is made to introduce a flushing liquid or cleaning liquid under high pressure into the system. In this, the cleaning liquid is initially introduced into the filter from the exterior, with the introduction of the cleaning liquid being carried out by using at least one conduit that has a large cross-section.

Subsequently, the liquid is passed from the exterior into the chamber for the liquid to be filtered (unfiltrate) of each filter element, through holes having a comparatively small cross-section, with liquid flows arising that are essentially directed from the peripheral surface of the filter element to the round opening that is disposed at the center of the filter element.

The holes that are disposed at the peripheral surface of the filter element are, for example, arranged in pairs, whereby one of these holes is configured in such a way that the liquid that is flowing through this hole imparts a rotational movement to the filter cake, and the other hole is configured in such a way that the liquid flowing though this hole divides the filter cake into small parts such that the entire filter cake can be removed through the liquid to be filtered (unfiltrate) conduit without problems arising.

A filter apparatus in accordance with the mentioned European Patent No. 0 379 054 B1 achieves an outstanding filtering capacity, while requiring a small space and a low consumption of filter aid, such as, for example, diatomaceous earth.

It is of disadvantage in such an apparatus that there arises an unsatisfactory behavior during cleaning or, respectively, flushing or rinsing.

During cleaning and/or flushing or rinsing, the slotted sieve tray is also to be cleaned so as to be free of filter residues adhering thereto. For this, the back side of the slotted sieve tray is contacted with rinsing or flushing liquid, with the rinsing or flushing liquid being introduced into the filter elements through the filtrate conduit. The rinsing or flushing liquid flows through the slotted sieve tray, entering from the filtrate side, to the liquid to be filtered (unfiltrate) side and along this course removes filter residues adhering to the slotted sieve tray.

The disadvantages already mentioned herein above reside therein that the rinsing or flushing liquid is introduced with a predetermined stream volume that can not be increased in a selective manner, which stream volume needs to be distributed, due to the spatial arrangements, to a plurality of filter elements. In this, it also needs to be noted that these filter elements have a large area that needs to be cleaned, i.e., the circular/annular surface of the corresponding slotted sieve tray; this means that the stream velocities that can be attained within the filter elements, as a rule, are not sufficient to effectuate loosening of all filter residues or, respectively, dirt particles from the slotted sieve trays and are not sufficient to subsequently remove such filter residues or, respectively, dirt particles.

The resulting reduction of the stream velocity is particularly pronounced when one compares the cross-sectional areas of the delivery conduit(s) for the flushing or rinsing liquid with the sum of the areas of the slotted sieve trays of all filter elements.

Because these filter elements, furthermore, are disposed at different height levels, the magnitudes of the stream volumes, that, for example, reach the lowermost, the central or, however, the uppermost filter element, differ substantially from one another.

The stream volume that reaches a filter element can be further reduced due to its division into a plurality of partial streams, due to the different height levels, and due to other factors that are not further described in detail herein, to the point that negative effects are present also during the removal of the filter cake.

Thus, for example, there may arise the case that the filter cakes of individual filter elements are not entirely divided or broken into smaller components and removed from the separating plane during the cleaning process, such that cleaning is incomplete and this is leading to a lowering of the efficiency of subsequent filtrations.

The effect described herein-above, that stream volumes of different magnitudes per filter element occur, is also of detriment during the normal operation by lowering the filtration capacity, because all the filter elements are not supplied optimally with liquid to be filtered (unfiltrate) and, accordingly, they can not contribute to the maximally possible extent of the filtration capacity.

This effect, as a rule, leads to an increase of the size of such filter installations, this causing increased acquisition and operating costs.

OBJECTS

It is an object at the time of the filing of this patent application, to provide a beverage bottling plant for filling bottles with a liquid beverage filling material, a container filling machine, and a filter arrangement.

It is also an object at the time of the filing of this patent application to provide for remedy and improvement in filtration of beverages, such that the cleaning and rinsing, or flushing, in such a filter arrangement can be accomplished rapidly, completely, and error-free and that by a uniform supply of the individual filter elements with liquid to be filtered (unfiltrate), an optimal filtration capacity is attained and wherein the space requirements and costs of the apparatus in accordance with the application in comparison with known apparatus are markedly reduced.

SUMMARY

The application teaches that these objects can be accomplished by an embodiment that is believed at the time of the filing of this patent application to possibly reside broadly in a filter apparatus having a plurality of filtering regions that are disposed above one another in the direction of a central filter axis and that are disposed essentially horizontally with at least one central distributor conduit 2 being associated with said filtering regions, with at least one common channel 1 for delivering liquid to be filtered (unfiltrate), as well as with at least one common channel 14 for removing filtered liquid (filtrate) being associated with said filtering region, and said filter apparatus comprising at least one filter layer that is disposed at a filter element 7, said layer being configured to serve to produce, for the purpose of precoating, at least one precoat layer that is configured by at least one filter aid and said filter layer separating a filtrate collecting space that discharges into the filtrate channel 14, from a sludge compartment that is positioned above the filtrate collecting space, the filter apparatus also comprising for each filter element 7 an annular feed channel 6 that is disposed about the central axis of the filter apparatus, said annular feed channel being configured to discharge at an exit opening into the sludge compartment 15 by way of a larger first radial distance from the central filter axis and, by way of a smaller second radial distance from the central filter axis, comprising at least one entrance opening for the liquid to be filtered (unfiltrate), said entrance opening being in communication with the channel for liquid to be filtered (unfiltrate), whereby the exit of the liquid to be filtered (unfiltrate) channel that is surrounded by filtering regions, is provided in the region of the central filter axis.

The application teaches that these objects can be accomplished by an embodiment that is believed at the time of the filing of this patent application to possibly reside broadly in a method of operating of such a filter apparatus.

For this, in one aspect, the application teaches that the stream volume of the flushing or rinsing medium, that is used to divide and remove the filter cake, is controlled by means of valve arrangements that are associated with each filter element in such a way that all filter elements are supplied with a sufficiently large stream volume; and in one particularly advantageous embodiment there is provided that each valve arrangement is configured to be individually controllable, such that the stream volume of the flushing or rinsing liquid can simultaneously be passed to one or to several filter elements.

It is also provided to configure each filtrate outlet of each filter element to be controllable by way of its own valve arrangement or by an associated valve arrangement, and this affords a selective control of the stream volume of the liquid to be filtered (unfiltrate) during normal operation of each filter element, and this further leading to an aimed control of the stream volume of the rinsing or flushing medium during flushing or rinsing of the slotted sieve trays of each filter element.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other. and non-obvious one with respect to the other.

BRIEF DESCRIPTION OF THE DRAWINGS

The embodiments of the application are explained in greater detail below with reference to the accompanying drawings.

FIG. 2 shows an embodiment of a filter apparatus in a simplified exploded view;

FIG. 3 shows the flow conditions upon introduction of liquid to be filtered (unfiltrate) into the individual filter elements in an enlarged detail view;

DESCRIPTION OF EMBODIMENTS

Figure 8:
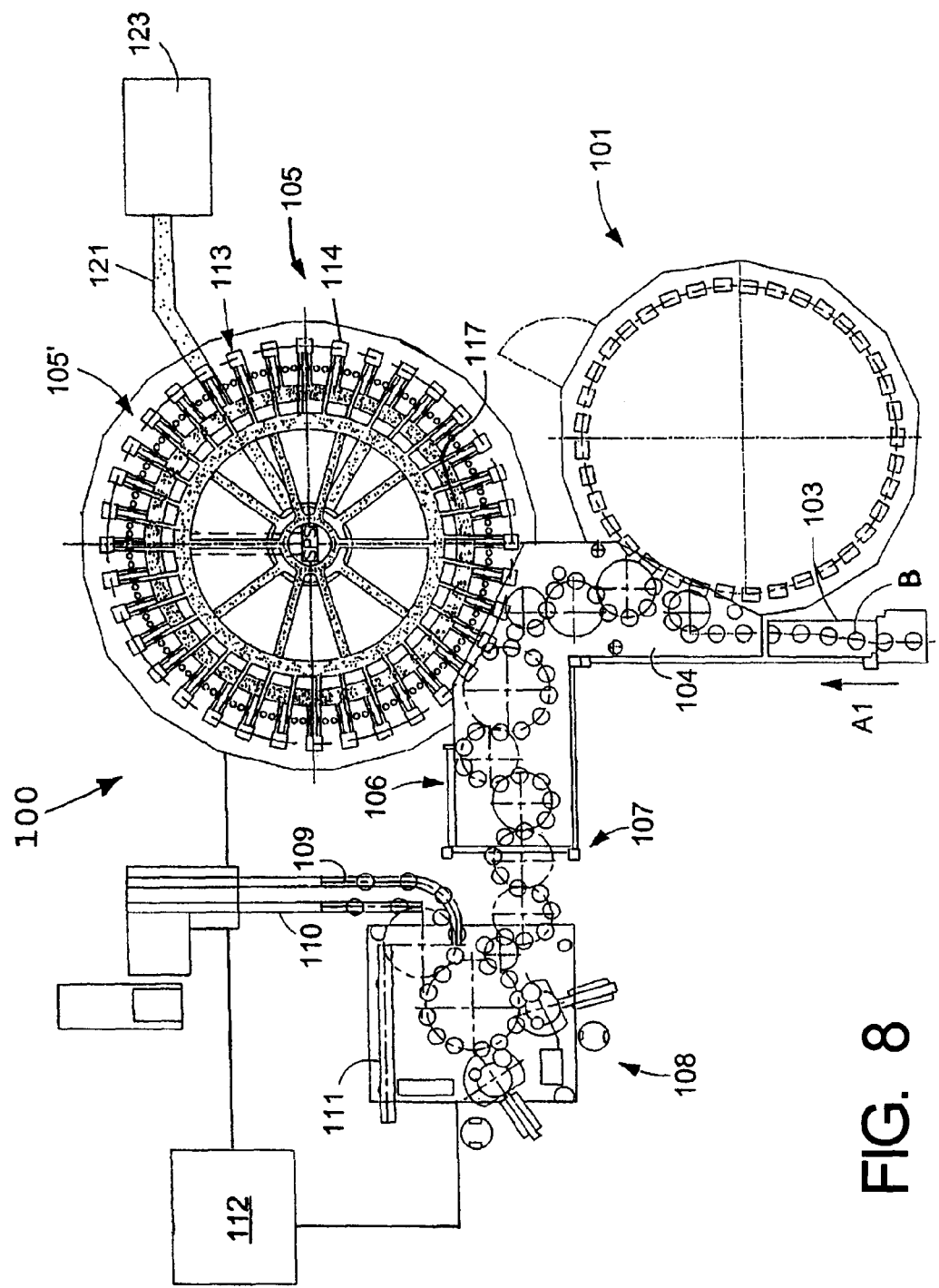
FIG. 8 is a top plan view illustrating schematically a beverage bottling plant in accordance with one embodiment of the application.

FIG. 8 shows schematically the main components of one embodiment example of a system for filling containers, specifically, an embodiment of a beverage bottling plant 100 for filling bottles B with liquid beverage filling material, in accordance with one embodiment, or in which system or plant could possibly be utilized at least one aspect, or several aspects, of the embodiments disclosed herein.

FIG. 8 shows a rinsing arrangement, or rinsing station, or rinser 101, also referred to as a cleaning station, to which the containers, namely bottles B, are fed in the direction of travel as is indicated by the arrow A, by means of a conveyer arrangement to feed bottles B to the rinsing station 101, and downstream of rinser station 101, in the direction of travel as is indicated by the arrow A, the rinsed bottles B are transported to a beverage filling machine 105 by means of a conveyer arrangement 104 that is formed, for example, by a star wheel conveyer or a plurality of star wheels of a conveyer arrangement as is known in the art. The conveyer arrangement 104 may possibly have a star wheel that introduces bottles B to the filling machine 105.

Downstream of the filling machine 105, in the direction of travel of the bottles B, there may possibly be a closer or closing arrangement, or closing station 106 which closes the bottles B.

The closing station 106 can, for example, be connected directly to a labeling arrangement 108, such as, for example, by means of a conveyer arrangement 107 that may be formed, for example, by a plurality of star wheels of a conveyer arrangement.

In the illustrated embodiment, the labeling station 108 has, for example, three outputs, namely one output formed by a conveyer or conveyer arrangement 109 for bottles B that are filled with a first product or volume. The first product may possibly be provided by a product mixer or storage 123 that is connected to the filling machine 105, for example, through a conduit arrangement 121, and bottles B that are filled with a predetermined volume of liquid beverage filling material, that is, the first product, are then labeled by a labeling module in the labeling stations 108 corresponding to this first product delivered from product mixer 123 to the beverage filling machine 105 and thence to the corresponding bottles B.

A second output that is formed by a conveyer arrangement 110 is provided for those bottles B that are filled with a second product or volume.

A third output, for example, formed by a conveyer or conveyer arrangement 111, removes any bottles B which have been incorrectly labeled as may have been determined by an inspecting device or an inspecting station that may possibly form a part of the labeling station 108.

In FIG. 8 item 112 is a central control arrangement, controller, with a computer to process algorithms.

The beverage filling machine 105 may possibly be of the revolving design, with a rotor 105', which revolves around a vertical machine axis. On the periphery of the rotor 105' there are a number of filling positions 113, each of which comprises bottle carriers or container carriers that are configured and disposed to present bottles B for filling, as well as a filling device or element or apparatus having at least one filling valve, for example. The filling valves comprise apparatus configured to introduce a predetermined volume of liquid beverage filling material into the interior of bottles B to a predetermined level of liquid beverage filling material. Furthermore, the filling valves comprise apparatus configured to terminate the filling of bottles upon liquid beverage filling material reaching the predetermined level in bottles B. In other words, the filling valves are configured and disposed to provide a predetermined flow of liquid beverage filling material from the source thereof into the bottles B.

A toroidal vessel 117 is a component, for example, of the revolving rotor 105'. The toroidal vessel 117 can be connected by means of a rotary coupling or a coupling that permits rotation, and by means of conduit arrangement or connecting line 121 to the external reservoir or product mixer 123 to supply the product, that is, product mix one, for example.

As well as the more typical filling machines having one toroidal vessel, it is possible that in at least one possible embodiment a filling machine could possibly be utilized wherein each filling valve is possibly connected by means of two connections to a toroidal vessel 117.

Thus, the system of a bottling plant as is illustrated in FIG. 8, may be applicable to single-product installations, or a multi-product or volume installations, or other commensurate embodiments.

Further development details, advantages and possibilities of application of the application can be obtained from the following description of embodiments and the drawing. With this, all described and/or illustrated features per se or in any combination, comprise the substance of the application, regardless of their combination in the claims or their dependency. At the same time, the content of the claims is made a component of the description.

As is illustrated in FIG. 2, the liquid to be filtered (unfiltrate) flows through the corresponding feed or inlet conduits to a central distributing conduit 2 that is disposed within the filter, with the liquid to be filtered (unfiltrate) being introduced, so as to enhance the flow conditions, into the filter 3 from the upper end of the filter as well as from the lower end of the filter.

So as to further enhance the introduction of liquid to be filtered (unfiltrate) into the individual filter elements 7, the central distributing conduit 2 is provided with numerous conduits 4 that are disposed to radially project from the central distributing conduit 2. In order to prevent that the filter cake 5 is not subjected to turbulence during the filtration process, it has been found particularly advantageous to dispose the conduits 4 at such a height level such that the stream volume exiting therefrom does not directly enter into an inlet channel 6 of a filter element 7, but instead is directed onto the interior wall of the filter element 7, this diminishing the marked velocity vector and direction vector of the flow, which, in the end, achieves a uniform and largely turbulence-free flow delivery of the filter cakes 5.

The filter cake 5 is disposed on a slotted sieve tray 8 that, in turn, is supported on a separating plate 9. This separating plate 9 also serves as the fluid-tight separation of the filter chamber of the corresponding filter element 7 with respect to the liquid to be filtered (unfiltrate) chamber of the adjacent filter element that is disposed beneath the discussed filter element 7.

The cleaning process of a filter arrangement in accordance with the application comprises essentially two steps. In the first step, the filter cake 5 is broken into fragments and/or is removed. The second step comprises flushing or rinsing of the slotted sieve tray 8.

Figure 7:
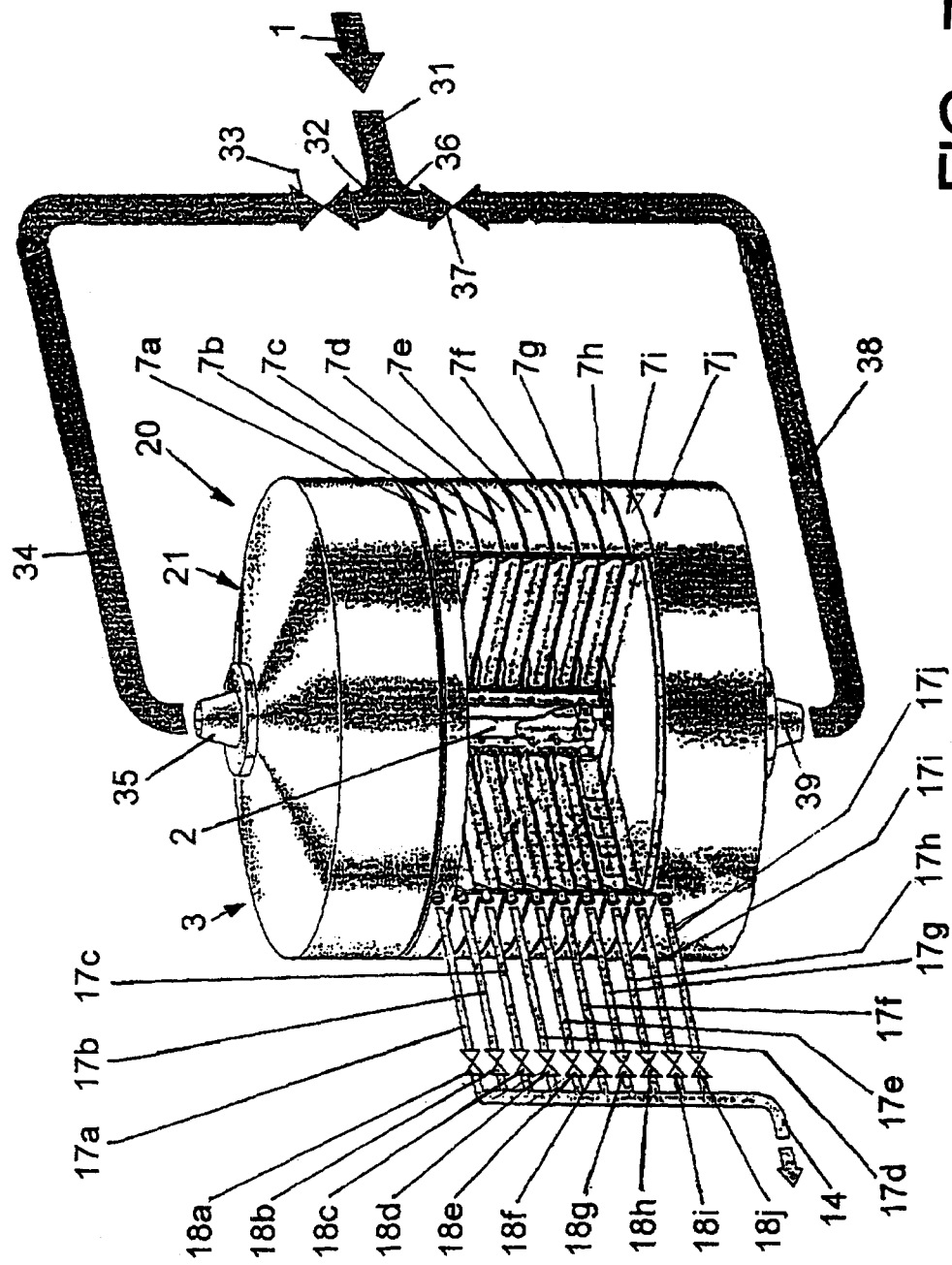
FIG. 7 is a view similar to FIG. 2 and identifying additional details of the filter apparatus.

In other words, with reference to FIG. 7, the filter arrangement 20 in at least one embodiment comprises a cylindrical filter structure 21 that has ten cylindrical filter chambers, 7a, 7b, 7c, 7d, 7e, 7f, 7g, 7h, 7i, and 7j.

In the following, corresponding components of a filter chamber, generally referred to as filter chamber 7, or filter element 7, are correspondingly identified with the letters 'a' to 'j'.

It will be appreciated that other configurations other than circular configurations are within the scope of the present application, e.g., rectangular or other configurations.

Figure 6:
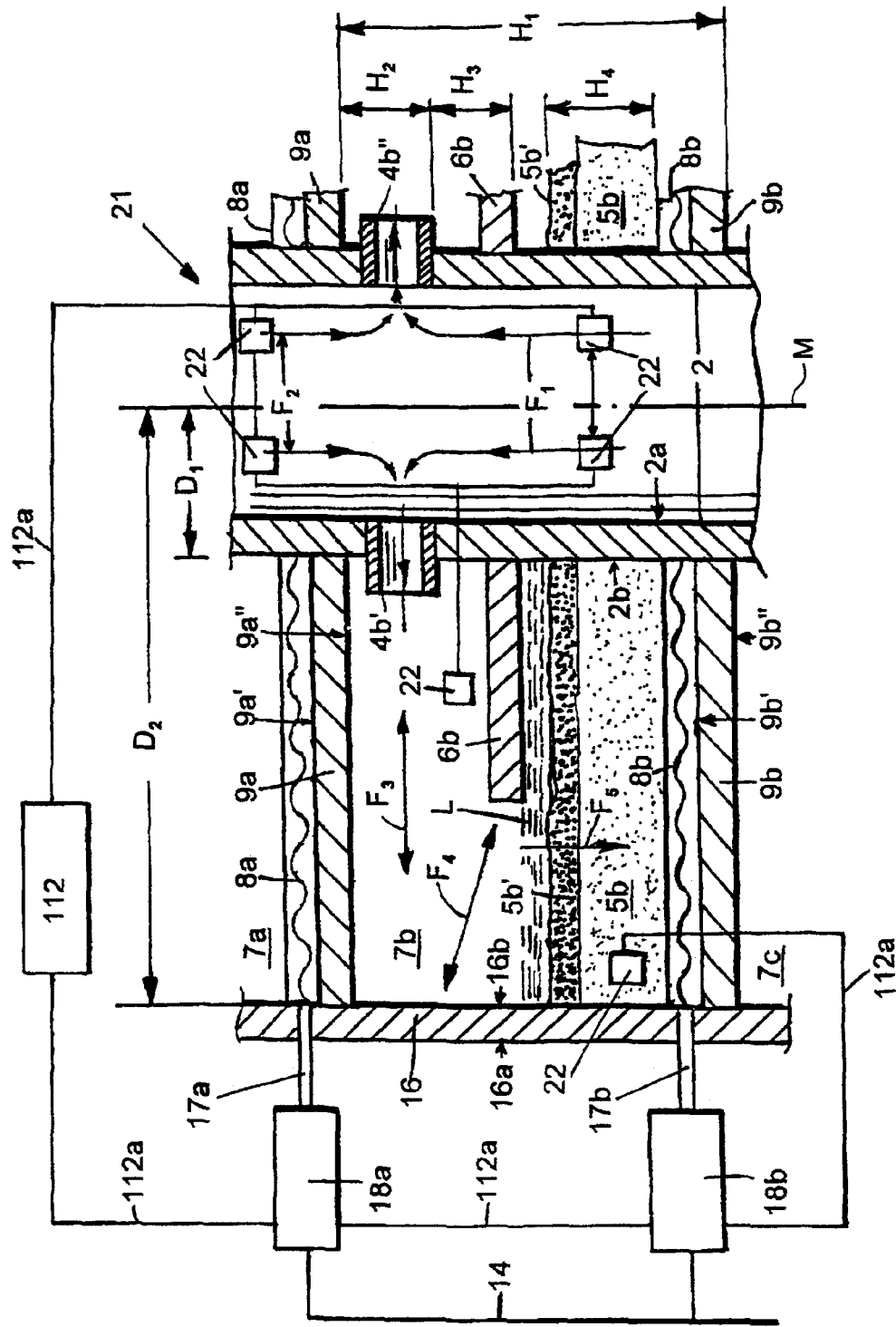
FIG. 6 is a detailed view of a filter chamber.

The configuration of a filter chamber, such as, a filter chamber 7b, also referred to as filter element herein, is illustrated in greater detail in FIG. 6. It will be appreciated that the other filter chambers of the filter structure 21 are correspondingly configured.

Thus, filter chamber 7b has an upper wall 9a, that has a upper surface 9a' that is facing the filter chamber 7a. The upper wall 9a has a lower surface 9a" that is facing the interior of the filter chamber 7b. The filter chamber 7b has a lower wall 9b, that has an upper surface 9b' that is facing the interior of the filter chamber 7b. The lower surface 9b" of lower wall 9b is facing the interior of filter chamber 7c. The lateral sides of the filter chamber 7b are provided by the central distributing conduit 2, particularly the surface 2b of the central distributing conduit 2 and the surface 16a of the outer wall 16 of the filter structure 21. The central distributing conduit 2 also has an inner surface 2a. The surface 2b is disposed at a radial distance $D_1$ from the central axis M of the central distributing conduit 2. The surface 16b is disposed at a radial distance $D_2$ from the central axis M of the central distributing conduit 2. Thus, the inner wall 2a is part of the centrally-disposed feed conduit 2 and the outer wall 16 is part of the outer arrangement of the filter structure 21.

More particularly, filter chamber 7b is connected to the central feed conduit 2 by at least one conduit or by a plurality of conduits, 4b', 4b", that are configured and disposed to provide communication between the central feed conduit 2 and the filter chamber 7b. The conduits 4b', 4b" may possibly disposed in a radially spaced manner about the central feed conduit 2 to adequately supply liquid to be filtered unfiltrate from the central feed conduit 2 into filter chamber 7b.

Furthermore, the filter chamber 7b has a baffle structure 6b that is configured and disposed to ensure introduction of liquid to be filtered unfiltrate over a wide area of the filter chamber 7b, i.e., baffle 6b will be disposed to possibly ensure that the liquid to be filtered (unfiltrate) is delivered at a distance away from the conduits, 4b', 4b", so as to minimize accumulation of the solids contents of the liquid to be filtered (unfiltrate) near the regions where the conduits 4b', 4b" enter the filter chamber 7b.

As shown in FIG. 7, the centrally-disposed feed conduit 2 of the filter structure 21 is configured and disposed to deliver liquid to be filtered (unfiltrate) either from the top end 35 of the filter structure 21, or from the bottom end 39 of the filter structure 21, with operation of the liquid supply being controlled so as to supply liquid to be filtered from the top end 35 and/or the bottom end 39 as is appropriate for selected operating conditions.

The feed conduit 2 for the liquid to be filtered in at least one embodiment may be disposed laterally at the side of the filter structure 21. A plurality of feed conduits 21 is also within the scope of the present application.

More specifically, with reference to FIG. 7, the liquid to be filtered is introduced at 1 into a conduit portion 31 and in upward direction through conduit portion 32, the valve arrangement 33 and thence through the upper conduit portion 34 and through the upper inlet 35 into the centrally-disposed feed conduit 2. Similarly, liquid to be filtered is passed through the downwardly directed conduit portion 36, through the valve arrangement 37, and through the lower conduit portion 38 into the lower inlet 39, and thence into the centrally-disposed feed conduit 2. As is schematically indicated in FIG. 6, the liquid to be filtered is passed in the directions of arrows $F_1$ and/or $F_2$ into the filter chamber 7b. The movement of liquid within the filer chamber 7b may be linear, arrow $F_3$, or irregular, arrow $F_4$, and will generally serve to pass liquid to be filtered through the filter-aid cake 5b, arrow $F_5$, through the slotted sieve tray 8b, and thence through the conduit 17b, through valve 18b into the exit conduit 14.

The conduits or passages, such as, 17a, 17b, etc. are possibly inclined relative to the horizontal in such a way that the longitudinal extension of each channel forms with the top wall 9a or bottom wall 9b disposed there-above and there-below, respectively, an acute angle that is open in the direction toward the central axis M of the filter 3.

It will be appreciated that the height $H_1$ of a filter chamber 7a, 7b, etc. will be selected in reference to the volume of the filter chamber and in reference to the volume of liquid to be filtered. The nozzles 4b' and 4b" will possibly be disposed at a distance $H_2$ from the top wall of the filter chamber so as to maximize problem-free introduction of the liquid to be filtered into the filter chamber. Furthermore, the baffle 6 will be disposed at a distance $H_3$ from the nozzles 4b' and 4b" to maximize distribution of liquid to be filtered in the filter chamber. It will be appreciated that the combined height or depth of the filter-aid layer 5a, 5b, etc. and the residue layer 5a', 5b', etc. will be controlled so as to minimize plugging of the filter chamber and to maximize filtration of liquid to be filtered.

The liquid to be filtered (unfiltrate) may possibly be a liquid containing beer brewing mash, say for a high-alcohol beer, and the liquid may be filtered in the filter arrangement to remove microorganisms, bacteria, yeast, solids, i.e., impurities that are to be precluded to be present in the final beer liquid.

The liquid to be filtered may possibly be diluted with water or the filtered liquid may be diluted with water, for example. When the filtered liquid is diluted with water, such dilution operation will of course lead to an increase of the efficiency of and a reduction in the size of the filter structure 21, and these factors leading, in turn, to lower equipment, operating costs, and maintenance costs.

Each filter chamber, 7a, 7b, etc., has at least one or a plurality of port structures 17a, 17b, etc., that are disposed in the outer wall 16 of the filter structure 21. Each port structure, 17a, 17b, etc., provides for communication between a filter chamber 7a, 7b, etc., and the common exterior conduit for filtered liquid, or exit, conduit 14, with a valve arrangement, herein-after referred to as valve, 18a, 18b, etc., being disposed between each port structure, 17a, 17b, etc., which valve, 18a, 18b, etc., controls the flow of filtered liquid from a filter chamber, 7a, 7b, etc., more particularly controlling the flow of filtered liquid that passes through the sieve structure, such as, sieve structure 8a, sieve structure 8b, and so forth.

In at least one embodiment, a plurality of conduits 14 for removal of liquid that has been filtered may be connected to a filter chamber, such as filter chamber 7a, filter chamber 7b, and so forth.

For cleaning of the filter chamber, 7a, 7b, etc., in at least one embodiment, cleaning liquid is possibly passed through the conduit 14, with the flow of cleaning liquid being regulated by the valve, 18a, 18b, etc., and the cleaning liquid is passed into the filter chamber, 7a, 7b, etc., for the cleaning operation upon completion of the filtration operation.

While the forgoing description describes the use of one conduit 14 and the associated valve, 18a, 18b, etc., for removing liquid that has been filtered from a filter chamber, 7a, 7b, etc., and for introducing cleaning liquid into a filter chamber, 7a, 7b, etc., it is also within the scope of the application to have a first conduit with an associated valve arrangement configured and disposed to remove liquid that has been filtered from a filter chamber, 7a, 7b, etc., and a second conduit with an associated valve arrangement for the introduction of cleaning liquid into a filter chamber, 7a, 7b, etc., so as to effectuate cleaning of a filter chamber, such as, filter chamber 7a, filter chamber 7b, and so forth.

Sensors 22 are disposed in the filter structure 21 to sense operating parameters. The sensors 22 are possibly located in different locations throughout the filter structure 21, such as, for example, in the feed duct 2, in the filter chambers 7, and in the exit conduit 17. They may possibly be located between the filter chamber 7 and the valve 18.

It will be appreciated that the valves or valve arrangements, 18a, 18b, etc., are connected to one another by lines 112a and to a central control arrangement, controller 112, with a computer configured to process algorithms and to utilize look-up tables so that the filtration operation and/or cleaning operation are optimized individually and together in the filter chambers, 7a, 7b, etc., of the filter structure 21, particularly maximizing the efficiency and effectiveness of operation and performance of the filter 3.

Thus, the arrangement in accordance with at least one embodiment of the present application permits to adjust the filtration in each filter chamber, 7a, 7b, etc., separately to avoid changes in pressure, back-pressure, oscillations in flow, i.e., while one filter chamber, 7a, 7b, etc., is filling up with a liquid, liquid may be diverted to another filter chamber, 7a, 7b, etc., so as to minimize detrimental pressure condition oscillations within the filter 3 and to maximize liquid handling in the filter 3.

It will be appreciated that plugging of the filter 3 can be effectively controlled and minimized due to a separate valve arrangement, 18a, 18b, etc., for each filter chamber, 7a, 7b, etc., this permitting to introduce and remove liquids and gases that are handled in the filter 3.

Thus, it is within the scope of the present application, inter alia, to utilize the controller 112 to perform filtration using look-up tables and the like for optimization of the filtration operation and/or the cleaning operation.

The sensors 22 that are disposed within the filter structure 21 are possibly configured to monitor and/or measure the following operating conditions or parameters and possibly, based on the readings of the sensors 22 and the instructions issued by the controller 112, the following operating conditions or parameters, inter alia, may be controlled or varied:

(a) measure the pressure (pounds per square inch, Pascals, kilograms per square centimeter, etc.) of fluid streams, e.g., liquid to be filtered, filtered liquid, processing gases;

(b) other possible operating conditions, such as, for example, turbidity of fluid streams (using halogen light), rate of filling of a filter chamber, 7a, 7b, etc., utilization of a filter chamber 7a, 7b, etc.;

(c) velocity of fluid streams; and (d) specific gravity of fluid streams;

The monitored conditions obtained by the sensors 22 are the possibly be used in the controller 112 to optimize the filtration operation of the filter arrangement 20 and the cleaning operation of the filter arrangement 20 possibly using look-up tables for establishing optimal operating instructions to the associated pumps (10a, 11a, FIG. 4) and valves, 18a, 18b, etc., with use of algorithms for performing instructions, i.e., for obtaining maximized output and/or a maximized throughput. Thus, optimization of the filtration operation and of the cleaning operation is achieved in a preferred manner in each filter chamber, 7a, 7b, etc., individually or in a group of filter chambers 7a, 7b, and so forth.

The described arrangement comprising a plurality of filter chambers, 7a, 7b, etc., that are substantially identically equipped with inlet conduits, 4b', 4b'', sensors 22, baffles, 6a, 6b, port structures, 17a, 17b, etc., and valves, 18a, 18b, etc., is particularly advantageous because each one of the filter chambers, 7a, 7b, etc., can be monitored and controlled to optimize the filtration operation and the cleaning operation. Furthermore, it may be possible that a group of filter chambers, 7a, 7b, etc., is controlled to optimize the filtration operation of the filter structure 21 as well as the cleaning operation of the filter structure 21.

In other words, the pressure of the stream flows, either liquid to be filtered (unfiltrate) stream flow, filtered liquid stream flow, and cleaning fluid stream flow can be monitored and adjusted.

There can also possibly be monitored the turbidity or clarity of the liquid to be filtered.

It is also within the scope of the present application that the amount of residue 5b' is possibly monitored so as to achieve a maximized filtration in the filter chambers, 7a, 7b, etc., and cleaning of the filter or filtration chambers 7a, 7b, 7c, and so forth. In other words, if too much of residue 5b', is deposited on the filter-aid cake 5b, cleaning of the filter chamber, 7a, 7b, etc., may become difficult.

There may also be controlled the pressure in each filter chamber, 7a, 7b, etc., with a pressure of 2-3 bars, or 30-45 pounds per square inch possibly being an operating pressure.

The control of the filter structure in at least one embodiment will possibly serve to prevent that the upper end, near the upper inlet 35 of the filter structure 21 shows a greater pressure condition that is greater than the pressure condition at the other, lower, end, near the lower inlet 39 of the filter structure 21, i.e., the arrangement in one embodiment is possibly designed to achieve a substantial uniform pressure condition throughout the filter structure 21.

The adjustment may comprise an oscillating adjustment with issue of operating instructions to one filter chamber, 7a, 7b, etc., or a group of filter chambers, such as filter chamber 7a, filter chamber 7b, filter chamber 7c, and so forth. In other words, the distribution of the pressure of and the flow of liquid into the filter structure 21 and the distribution of the pressure and the flow of liquid within the filter chambers, 7a, 7b, etc., can be effectively monitored by the sensors 22, operating conditions obtained by the sensors 22 can then possibly be controlled or varied, for example, filling one filter chamber, 7a, 7b, etc., with a first amount of liquid and filling another filter chamber, 7a, 7b, etc., with another amount or volume, so as to adjust filtration in each filter chamber, 7a, 7b, etc., separately and/or in groups and thus to minimize changes in pressure, back-pressure, oscillations in flow and pressure, changes in flow and undesired pressure waves within the filter structure 21.

The adjustment may be for adjusting and/or correcting, inter alia, of:—

(a) the pressure distribution of the liquid to be filtered (unfiltrate) or cleaning liquid in a filter chamber, 7a, 7b, etc., or a group of filter chambers, 7a, 7b, etc.;

(b) the pressure at the inlet, 4b', 4b", into a filter chamber, 7a, 7b, etc.), the pressure at the outlet, 17a, 17b, etc., from a filter chamber, 7a, 7b, etc.;

(c) the distribution or magnitude of fluid pressure in a plurality of filter chambers, 7a, 7b, etc., with respect to one another;

(d) the distribution or magnitude of fluid pressure differential in a plurality of filter chambers, 7a, 7b, etc., with respect to one another;

(e) the rate of filling of a filter chamber, 7a, 7b, etc., or a group of filter chambers, 7a, 7b, etc., with liquid to be filtered (unfiltrate) or cleaning liquid;

(f) the degree of plugging-up of a filter chamber, 7a, 7b, etc., or a group of filter chambers, 7a, 7b, etc., (g) the adjustment of a valve or valves, 18a, 18b, etc., to open or to close as may possibly be required, this respectively leading to an adjustment of the pressure of either the liquid to be filtered, the filtered liquid, and the cleaning liquid;

(h) the adjustment of the pressure anywhere in the filter structure 21;

(i) back-pressure adjustment in a filter chamber or a group of filter chambers, 7a, 7b, etc.;

(j) pressure variations may be implemented as the filling of the filter structure 21 with liquid to be filtered or cleaning liquid progresses as a function of build-up of filter-aid cake 5b or the solids or residue 5b' removed from the liquid to be filtered that is disposed atop the filter-aid cake 5b;

(k) a change of the volume introduced into one filter chamber or a plurality of filter chambers, 7a, 7b, etc., i.e., it may be possible to fill one filter chamber with a first volume and another filter chamber with another volume of liquid to be filtered or cleaning liquid, (l) timing of the processing sequence will possibly be determined by optimizing the filtering and cleaning steps, thus one filter chamber, 7a, 7b, etc., may be filled within a first time period and another filter chamber, 7a, 7b, etc., may be filled in another time period; and (m) pressure-head in a filter chamber or a group of filter chambers, 7a, 7b, and so forth.

The filter arrangement 20 may possibly serve to control oscillations or possibly to preclude detrimental oscillations.

The valves, 18a, 18b, etc., may possibly be utilized to predominantly adjust the pressure of the liquid to be filtered, of the liquid that has been filtered, and of the cleaning solution that is employed to clean a filter chamber, 7a, 7b, and so forth.

Thus, for example, as solid residues 5b' build up, valves, 18a, 18b, etc., may possibly be opened to permit a greater and/or lesser flow and/or pressure of liquid from the input, 4b', 4b", through the filter chamber, 7a, 7b, etc., and through the port structure 17a, 17b, and so forth. The pressure of the liquid may possibly be different in different filter chambers, 7a, 7b, and so forth. The pressure may be controlled by the valves 18a, 18b, etc, to avoid pressure waves and to ensure a uniform pressure. It is also within the scope of the present application that the filter structure 21 is uniformly filled with liquid or is filled in a staged manner.

The valves, 18a, 18b, etc., may be actuated pneumatically, hydraulically, electrically, and manually, or combinations thereof and may possibly be controlled by the central computer unit 112.

Opening and closing of the valves may be from fully open and fully closed and any value between fully open and fully closed.

It will be appreciated that the valves in at least one embodiment may be quick-responding valves, 18a, 18b, etc., that are configured and disposed to be opened and to be closed to prevent pressure waves or oscillations in the filter arrangement, i.e., they will be opened and closed to establish a uniform pressure and operating behavior in the filter structure 21 and the filter chambers, 7a, 7b, etc., of the filter 3.

In essence, the present application provides in at least one embodiment a plurality of filters with inputs for the liquid to be filtered, with outputs for the filtered liquid and a plurality of valves and, as possible required with pumps, the operation of which is coordinated to maximize the flow-through of liquid and gas, preventing plugging and maximizing uniform behaviors of the filters.

Figure 1:
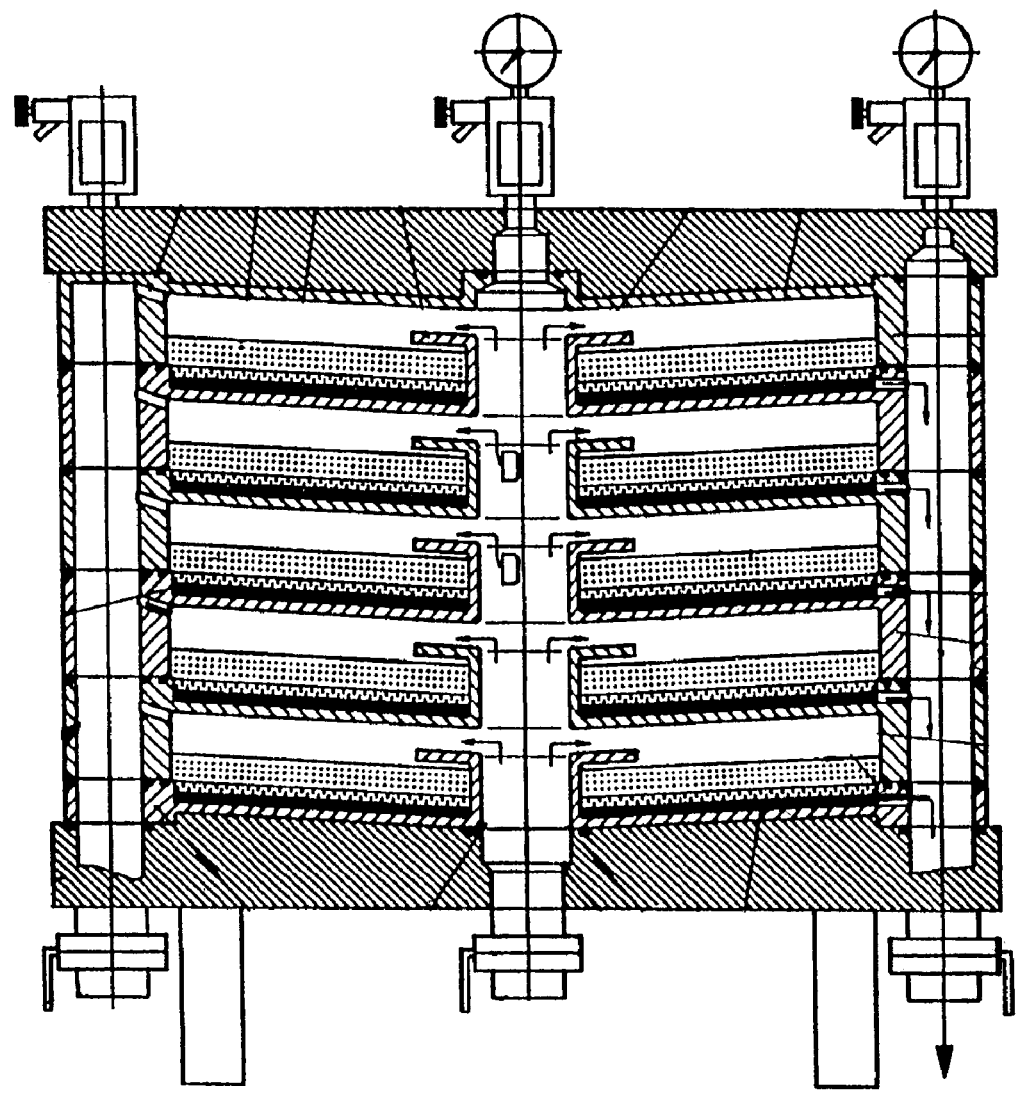
FIG. 1 illustrates a filter arrangement according to the prior art.
Figure 4:
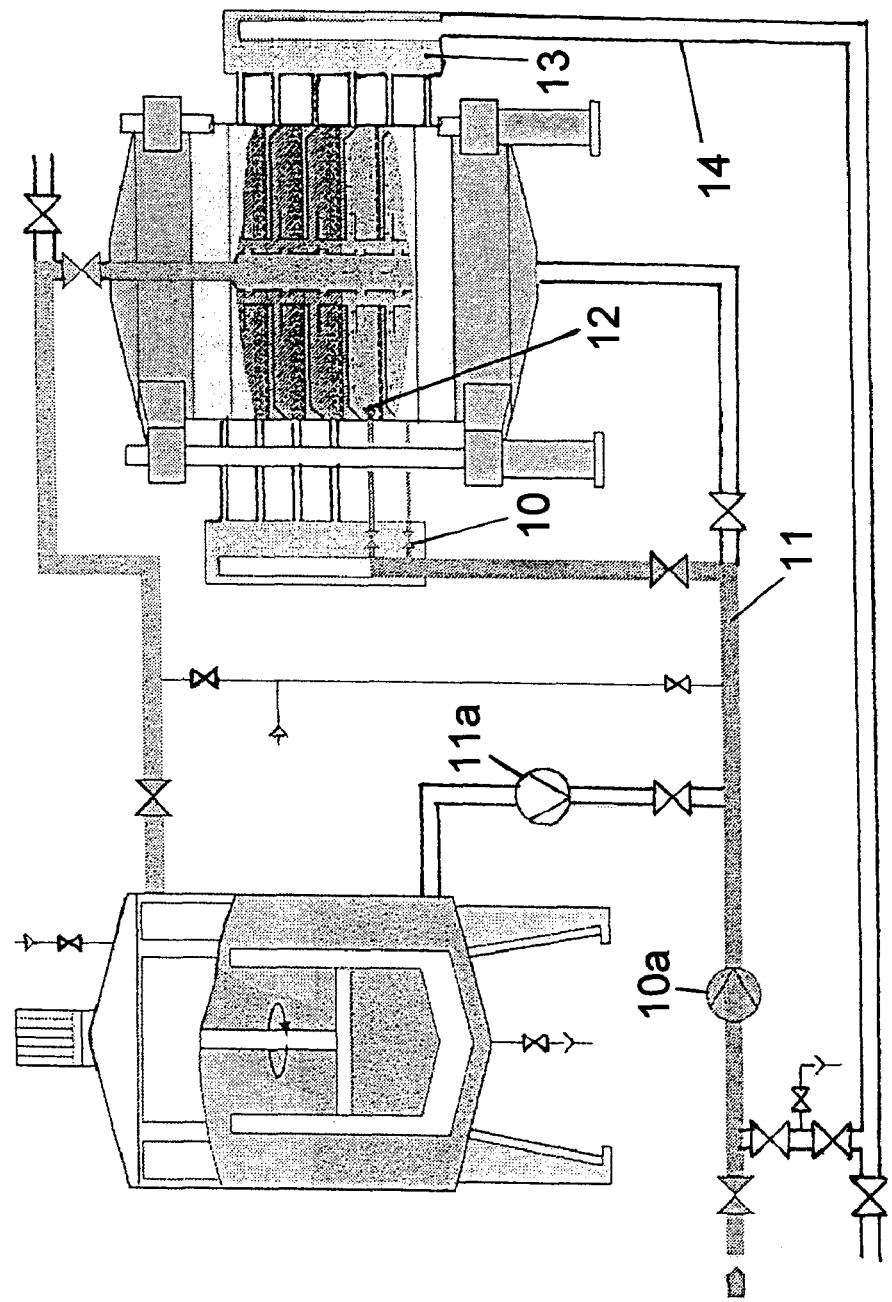
FIG. 4 shows the control of the stream volumes of the individual filter elements by the valve arrangements associated with the filter elements in a schematic cross-sectional presentation.

As is shown in FIG. 4, the flushing or rinsing liquid that is used for cleaning of the filter, such as, for example, water, is introduced into the filter elements 7, by way of a feed or inlet conduit 11, by way of valve arrangements 10 for the flushing or rinsing liquid, by way of exit nozzles 12, with the valve arrangements 10 for the flushing or rinsing liquid and the exit nozzles 12 being separately associated with each filter element 7.

The components, namely, valve arrangement 10 for the flushing or rinsing liquid and exit nozzles 12 may also be associated with each filter element 7 in a plurality, preferably in pairs, and may be disposed at opposite locations.

The scope of the application also includes that the filtrate exit of each filter element 7 is equipped with its own valve arrangement, the so-called filtrate valve arrangement 13 as is generically indicated in FIG. 4, and individual valves or valve arrangements 18a, 18b, 18c as are indicated in greater detail in FIG. 7 and in FIG. 6. In other words, individual valve arrangements for each filter chamber 7 are herein also referred to as valves 18a, 18b, and so forth.

Further details concerning such valve arrangement or valve arrangements are presented herein-below.

As has been mentioned herein-above, the exit nozzle 12 produces two liquid streams, with the first stream being directed in such a way that it moves the filter cake 5 so as to rotate, and the second stream is directed in such a way that its divides the filter cake 5 that has been subjected to rotation by the first stream into small components or fragments. The filter cake 5 that has been broken up in this manner is removed from the filter 3 by the flushing or rinsing liquid through the inlet channel 6 (see FIG. 3), through the conduits 4, and through the central distributing conduit 2 and is then passed to processing.

Subsequently, flushing or rinsing of the slotted sieve tray 8 is carried out. For this, the flushing or rinsing liquid is introduced into the filtrate chambers of the filter elements 7, with the flushing or rinsing liquid flowing through the filtrate valve arrangements 13 in the direction that is opposite to the direction of flow of the filtrate.

In order to positively avoid the disadvantages described herein-above that arise during removal of the filter cake 5 and the flushing or rinsing of the slotted sieve tray 8, due to the low flow velocities, the present application provides, aside from the arrangement of the valve arrangements 10 for the flushing or rinsing liquid and the valve arrangements 13 (and/or 18a, 18b, etc.) for the filtrate, to direct the stream volume of the flushing or rinsing liquid to one filter element 7 or to a group of filter elements 7, this achieving that in each one of these filter elements 7 there are attained a flow velocity and a stream volume that are of such a magnitude that during removal of the filter cake 5, as well as during cleaning of the slotted sieve tray 8, on optimal cleaning result is obtained.

It is obvious that all the filter elements 7 are contacted individually, or as part of a group of filter elements 7, during the cleaning process with the flushing or rinsing liquid.

There is provided that the valve arrangements 10 for the flushing or rinsing liquid and the valve arrangements 13 (and/or 18a, 18b, etc.) for the filtrate are configured as shut-off valves, that can only be brought into an open position or a closed position.

At the applicable locations, the valve arrangements 10 for the flushing or rinsing liquid and the valve arrangements 13 (and/or 18a, 18b, etc.) for the filtrate are referred to as valve arrangements for liquid.

In a further, particularly advantageous configuration of the present application, there is provided that the valve arrangements 10 for the flushing or rinsing liquid and the valve arrangements 13 (and or 18a, 18b, etc.) for the filtrate are configured as flow control valve arrangements, that permit control of the corresponding stream volume to any desired value between of from zero percent to one hundred percent, such that, for example, by a controlled compensation for the factors that reduce the stream volume, more filter elements 7 can be cleaned simultaneously, this achieving shorter cleaning times.

As well, all operation types for shut-off or flow control valve arrangements that are known in the art, such as, for example, electric, hydraulic, or pneumatic operation variants or combinations of such options are included in the scope of the present application.

Considerable advantages are obtained in the make up of the filter cake when each filter element 7 is equipped with its own valve arrangement 13 (or 18a, 18b, etc.) for the filtrate, since flushing of the filter cake can be controlled and aimed for each individual filter element 7.

The technical teaching of the present application includes the use of shut-off valve arrangements as well as also the use of flow control valve arrangements as the valve arrangements 13, 18a, 18b, etc. for the filtrate.

Also, for a further embodiment of the present application there is provided to dispose respectively at least two of the exit nozzles 12 and/or the filtrate exit openings in a group, whereby at a filter 3 also several groups can be formed. Each group is equipped with a valve arrangement 10 for the flushing or rinsing liquid or a valve arrangement 13 (and/or 18a, 18b, etc.) for the filtrate, depending on the type of elements that are grouped together. In such an arrangement it is of course not possible to realize the advantages described herein-above and herein-below to the fullest extent; however, instead there arise advantages with respect to manufacturing costs of such an installation. As well, the control effort for such an installation is reduced.

Also, the use of a combination of valve arrangements that are directly associated with a filter element 7 and of valve arrangements that are respectively associated with a group of filter elements 7, does not depart from the scope of the present application.

For all embodiments introduced within the scope of this application there is provided that the valve arrangements (10, 13, 18a, 18b, etc.) for liquid can be controlled individually or in groups.

In a further, particularly advantageous embodiment of the present application, there is provided that the pressure drop at each individual filter element 7 is determined and the corresponding reading is used for control of the entire filter and/or each individual filter element 7, this being done by appropriate devices, such as, for example, differential pressure sensors or pressure sensors in combination with a central pressure sensor that is disposed, for example, within the central distributing conduit 2 and a control unit. In this it is possible, when using an appropriate control unit, generally a computer-assisted control unit, to utilize the pressure drop that is determined for a certain filter element 7 in an aimed manner for control of the valve arrangement 13 (and/or 18a, 18b, etc.) for the filtrate that is associated with this filter element 7.

By proceeding in this manner it becomes possible, particularly when using flow control valves, to operate the entire filter in an optimized manner. Thus, it is now possible for the first time, to operate all filter elements 7 in such a way that all filter elements 7 exhibit the same pressure drop during filtration, this leading to particular advantages with respect to energy consumption and filtration results. It is, furthermore, possible to exclude individual filter elements, that due to soiling or accumulation of dirt exhibit a pressure drop that is too large, by closing of the corresponding valve arrangement 13 (and/or 18a, 18b, etc.) for the filtrate, from the filtration process.

For the determination of the pressure drop at each individual filter element 7 it is advantageous to set all valve arrangements 13 (and/or 18a, 18b, etc.) for the filtrate in the same position, thus, for example, to fully open them, and to determine the resultant pressure drop for each filter element 7 in this situation.

As well, in connection with the utilization of for the pressure sensors, within the scope of a further embodiment there is provided that a plurality of filter elements 7 is equipped with a common pressure sensor, and with respect to the advantages and disadvantages of this processing, reference can be had to the corresponding discussions of the valve arrangements for the liquids.

Figure 5:
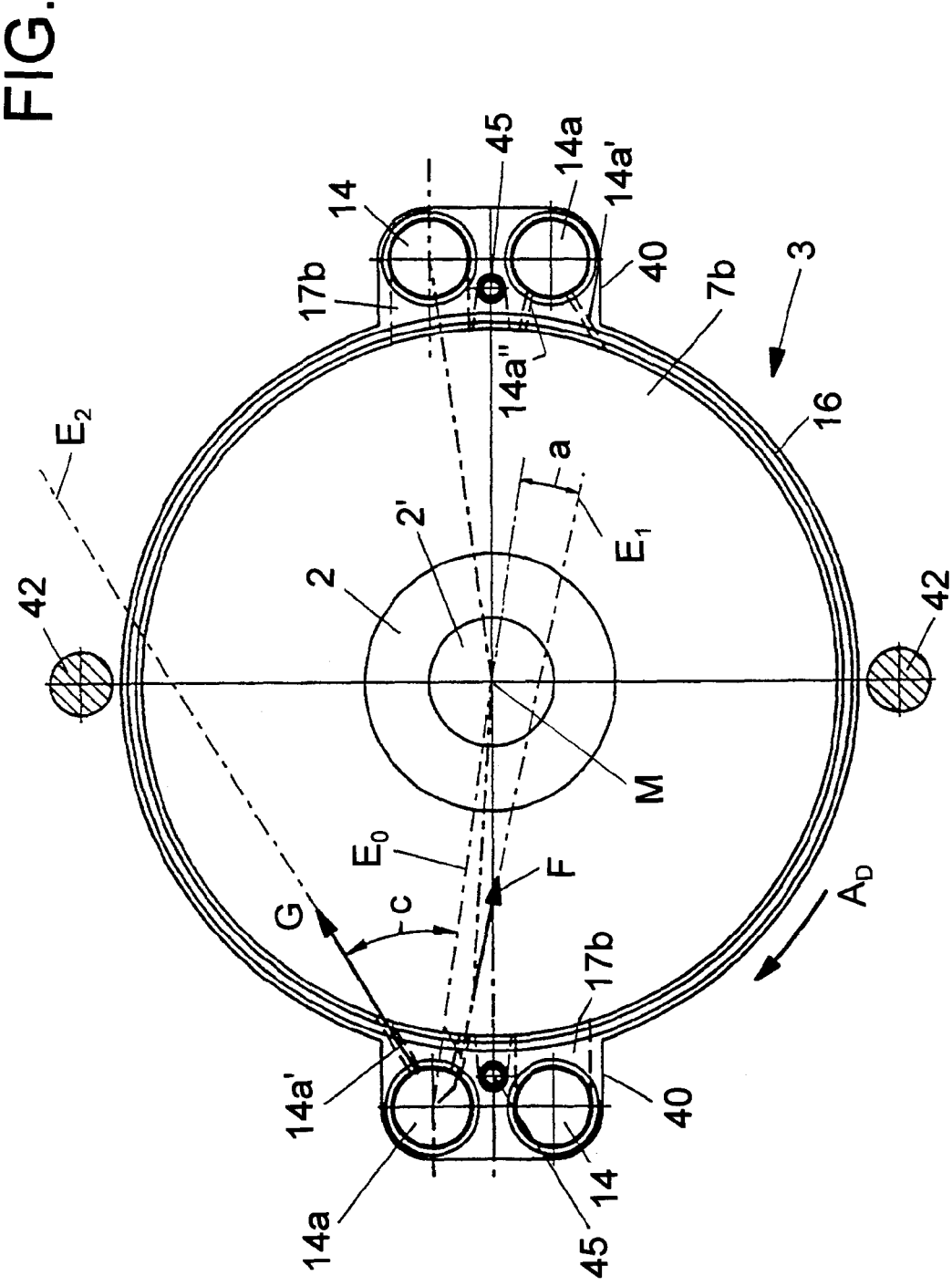
FIG. 5 is a horizontal cross-section through a filter chamber in accordance with one embodiment of the present application.

As shown in particular in FIG. 5, showing a horizontal cross-section through a filter chamber, such as, filter chamber 7b, there are provided two projecting portions 40 that extend beyond the outer wall 16 or surface 16a (see FIG. 6). Each one of the two projecting portions 40 is provided with three channels or channel portions, namely, a channel 14 for the passage of filtered liquid, a flushing channel 14a for the passage of cleaning liquid, and a venting channel 45. These channels may possibly have a circular cross-sectional configuration. The arrangement of the channels or channel portions 14, 14a, and 45 is such that in a given circumferential direction, for example the clockwise direction indicated by the arrow $A_D$ in FIG. 5, at each projecting portion 40 the channel portion 14a follows the channel portion 14, with these channel portions 14 and 14a each having the same radial spacing from the central axis M of the filter 3, and, relative to the central axis M of the filter 3, each channel portion 14 at a given projecting portion 40 is disposed diametrically across from the corresponding channel portion 14 of the other projecting portion 40. The same applies to the channel portions 14a of the two projecting portions 40. The channel portions 14 and 14a may possibly have the same cross-sectional configuration. The channel portion 45 is provided between the channel portions 14 and 14a at each projecting portion 40 at a lesser radial distance from the central axis M of the filter 3. Passage 2' of the centrally-disposed feed conduit 2 extends about the central axis M. The channel portions 45 may possibly have a considerably smaller cross-sectional configuration than do the channel portions 14 and 14a. Relative to the central axis M of the filter 3, the channel portions 45 may also be disposed diametrically across from one another.

In the embodiment according to FIG. 5, the flushing channel 14a communicates with filter chamber 7b by way of two passage 14a' and 14a". All of the passages, such as 14a' and 14a", of all of the filter elements, 7a, 7b, etc., that open into a given flushing channel 14a have their longitudinal extensions disposed in a common vertical plane $E_1$ that, with a vertical reference plane $E_0$ in which is disposed the central axis M of the filter and which intersects the plane $E_1$ along the axis of the pertaining flushing channel 14a, forms an angle "a" such that in the aforementioned clockwise direction of the arrow $A_D$ about the central axis M of the filter 3, the plane $E_1$ follows the reference plane $E_0$. In the illustrated embodiment according to FIG. 5, the angle "a" is only a few degrees in magnitude.

Starting from the respective channel portion 14a, the passage 14a' that discharges cleaning fluid in the direction of arrow G, similar to the passage 14a" that discharges cleaning fluid in the direction F, also extend downwardly at an angle. Those passages 14a' of all of the filter elements 7a, 7b, etc. that are provided at a given flushing channel 14a possibly have their axes disposed in a common vertical plane $E_2$ that possibly forms an acute angle "c" with the reference plane $E_0$. The angle "c" is possibly considerably greater than the angle "a", but is also possibly considerably less than 90 degrees and is, for example, of an order of magnitude of 45 degrees. The angle "c" of the passages 14a' of both of the flushing channels 14a opens in the same circumferential direction, i.e., in the direction of the arrow $A_D$. However, it should be noted that for the flushing function it is not absolutely necessary that the passages 14a' and 14a" be directed as described above. Rather, it is merely necessary that the discharge openings that are provided on the inner surface 16b (see FIG. 6) of the peripheral wall 16 for the flushing agent or liquid, and that can be formed, for example, from nozzle openings of nozzles that have been screwed or otherwise placed in, produce streams of flushing medium that are oriented in conformity with the described position of the axes of the passages or holes 14a' and 14a".

Reference numeral 42 identifies a retainer structure for filter 3.

One feature or aspect of an embodiment is believed at the time of the filing of this patent application to possibly reside broadly in Filter apparatus having a plurality of filtering regions that are disposed above one another in the direction of a central filter axis and that are disposed essentially horizontally with at least one central distributor conduit 2 being associated with said filtering regions, with at least one common channel 1 (see FIG. 7) for delivering liquid to be filtered (unfiltrate), as well as with at least one common channel 14 for removing filtered liquid (filtrate) being associated with said filtering region, and said filter apparatus comprising at least one filter layer that is disposed at a filter element 7, said layer being configured to serve to produce, for the purpose of precoating, at least one precoat layer that is configured by at least one filter aid and said filter layer separating a filtrate collecting space that discharges into the filtrate channel 14, from a sludge compartment that is positioned above the filtrate collecting space, the filter apparatus also comprising for each filter element 7 an annular feed channel 6 (see FIG. 3) that is disposed about the central axis of the filter apparatus, said annular feed channel being configured to discharge at an exit opening into the sludge compartment 15 by way of a larger first radial distance from the central filter axis and, by way of a smaller second radial distance from the central filter axis, comprising at least one entrance opening for the liquid to be filtered (unfiltrate), said entrance opening being in communication with the liquid to be filtered (unfiltrate) channel, whereby the exit of the liquid to be filtered (unfiltrate) channel that is surrounded by filtering regions, is provided in the region of the central filter axis, characterized in that with each filter element 7 and/or a group of filter elements 7 is associated at least one valve apparatus for fluid that is disposed in the exit stream of the filtered liquid.

Another feature or aspect of an embodiment is believed at the time of the filing of this patent application to possibly reside broadly in a filter apparatus, characterized in that at least one valve apparatus for fluid that is disposed in the feed conduit for the flushing liquid is associated with each filter element 7 and/or a group of filter elements 7.

Yet another feature or aspect of an embodiment is believed at the time of the filing of this patent application to possibly reside broadly in a filter apparatus characterized in that at least one pressure sensor is associated with each filter element 7 and/or a group of filter elements.

Still another feature or aspect of an embodiment is believed at the time of the filing of this patent application to possibly reside broadly in a filter apparatus characterized in that the pressure sensor comprises a pressure difference sensor.

A further feature or aspect of an embodiment is believed at the time of the filing of this patent application to possibly reside broadly in a filter apparatus characterized in that the pressure sensor comprises a system that comprises one pressure sensor for each filter element 7 and/or a group of filter elements 7, a central pressure sensor, and a computer-controlled control unit.

Another feature or aspect of an embodiment is believed at the time of the filing of this patent application to possibly reside broadly in a filter apparatus characterized in that the valve apparatus for fluid, 10, 13, 18a, 18b, etc. comprise shut-off valves and/or flow control valves.

Yet another feature or aspect of an embodiment is believed at the time of the filing of this patent application to possibly reside broadly in a filter apparatus characterized in that the valve apparatus for fluid, 10, 13, 18a, 18b, etc. can be controlled individually or in a group.

Still another feature or aspect of an embodiment is believed at the time of the filing of this patent application to possibly reside broadly in a method of cleaning a filter apparatus characterized in that the volume flow of the flushing fluid that is flowing into the filter elements 7 through the delivery nozzles 12 and/or through the filtrate compartment can be controlled for each filter element 7.

A further feature or aspect of an embodiment is believed at the time of the filing of this patent application to possibly reside broadly in a method of filtering with a filter apparatus characterized in that the volume flow that is flowing through the filtrate compartment can be controlled for each filter element 7.

Another feature or aspect of an embodiment is believed at the time of the filing of this patent application to possibly reside broadly in a method characterized in that the flushing fluid comprises an alkaline solution.

Yet another feature or aspect of an embodiment is believed at the time of the filing of this patent application to possibly reside broadly in a method characterized in that the filtrate valves 13 are controlled during filtering in such a way that all filter elements 7 are exhibit the same pressure drop.

One feature or aspect of an embodiment is believed at the time of the filing of this patent application to possibly reside broadly in a method characterized in that the individual filter elements 7 are then excluded from the filtration process, by way of closing of the associated filtrate valve 13, when the filter elements comprise a pressure drop that is too high (excessive).

The components disclosed in the various publications, disclosed or incorporated by reference herein, may possibly be used in possible embodiments of the present invention, as well as equivalents thereof.

Some examples of pneumatic valves which may possibly be utilized or adapted for use in at least one possible embodiment may possibly be found in the following U.S. Pat. No. 6,772,791, entitled "Directly operated pneumatic valve having an air assist return;" No. 6,729,346, entitled "Pneumatic valve;" No. 6,676,107, entitled "Control element, especially a pneumatic valve;" No. 6,550,416, entitled "Pneumatic valve device;" No. 6,543,481, entitled "Pilot operated pneumatic valve;" No. 6,488,050, entitled "Pneumatic valve assembly;" No. 6,089,251, entitled "Pneumatic valve;" No. 4,526,341, entitled "Pneumatic shut-off valve;" No. 4,515,183, entitled "Pneumatic control valve;" and No. 4,480,663, entitled "Pneumatic relay valve."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of hydraulic valves which may possibly be utilized or adapted for use in at least one possible embodiment may possibly be found in the following U.S. Pat. No. 6,712,090, entitled "Hydraulic valve;" No. 6,745,557, entitled "Hydraulic valve arrangement;" No. 6,578,819, entitled "Hydraulic valve;" No. 6,505,645, entitled "Multiple hydraulic valve assembly with a monolithic block; No. 6,499,505, entitled "Hydraulic valve arrangement;" No. 6,427,721, entitled "Hydraulic valve arrangement with locking function;" No. 6,412,392, entitled "Hydraulic valve for a hydraulic consumer of a vehicle;" No. 6,397,891, entitled "Hydraulic valve, in particular, adjustable pressure control valve;" No. 6,349,743, entitled "High-pressure hydraulic valve;" and No. 6,305,418, entitled "Hydraulic valve."

The appended drawings in their entirety, including all dimensions, proportions and/or shapes in at least one embodiment of the invention, are accurate and are hereby included by reference into this specification.

Some examples of electric valves which may possibly be utilized or adapted for use in at least one possible embodiment may possibly be found in the following U.S. Pat. No. 5,941,502, entitled "Electric valve assembly and method of making same;" No. 5,161,776, entitled "High speed electric valve;" No. 4,770,389, entitled "Electric valve device;" No. 4,699,167, entitled "Electric valve;" No. 4,681,298, entitled "Slidable electric valve device having a spring;" No. 4,580,761, entitled "Electric valve device having a rotatable core;" and No. 4,498,491, entitled "Thermo-electric valve."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of pressure sensors which may possibly be utilized or adapted for use in at least one possible embodiment may possibly be found in the following U.S. Pat. No. 6,765,196, entitled "Pressure sensor;" No. 6,755,084, entitled "Pressure sensor and method of manufacturing pressure sensor;" No. 6,745,633, entitled "Pressure sensor with electrically conductive spring bodies for connecting and fixing connector case and pads;" No. 6,743,180, entitled "Pressure sensor for use in an artery;" No. 6,732,590, entitled "Pressure sensor and process for producing the pressure sensor;" No. 6,715,356, entitled "Pressure sensor having metallic diaphragm seal mount;" No. 6,694,820, entitled "Pressure sensor;" No. 6,678,164, entitled "Pressure sensor and method for manufacturing the same;" No. 6,668,657, entitled "Pressure sensor;" and No. 6,668,238, entitled "Pressure sensor."

All, or substantially all, of the components and methods of the various embodiments may be used with at least one embodiment or all of the embodiments, if more than one embodiment is described herein.

In at least one embodiment, the filter arrangement has an apparatus having a plurality of filtering regions that are disposed above one another in the direction of a central filter axis and that are disposed essentially horizontally with at least one central distributor conduit 2 being associated with said filtering regions, with at least one common channel 1 for delivering liquid to be filtered (unfiltrate), as well as with at least one common channel 14 for removing filtered liquid (filtrate) being associated with said filtering region and said filter apparatus comprising at least one filter layer that is disposed at a filter element 7, said layer being configured to serve to produce, for the purpose of precoating, at least one precoat layer that is configured by at least one filter aid and said filter layer separating a filtrate collecting space that discharges into the filtrate channel 14, from a sludge compartment that is positioned above the filtrate collecting space, the filter apparatus also comprising for each filter element 7 an annular feed channel 6 that is disposed about the central axis of the filter apparatus said annular feed channel being configured to discharge at an exit opening into the sludge compartment 15 by way of a larger first radial distance from the central filter axis and, by way of a smaller second radial distance from the central filter axis, comprising at least one entrance opening for the liquid to be filtered (unfiltrate), said entrance opening being in communication with the liquid to be filtered (unfiltrate) channel, whereby the exit of the liquid to be filtered (unfiltrate) channel that is surrounded by filtering regions, is provided in the region of the central filter axis, and thereby it is provided that with each filter element 7 and/or a group of filter elements 7 is associated at least one valve apparatus for fluid that is disposed in the exit stream of the filtered liquid.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of bottling systems that may possibly be utilized or possibly adapted for use in at least one possible embodiment of the present application may possibly be found in the following U.S. patents, all assigned to the Assignee herein, namely: U.S. Pat. No. 4,911,285; No. 4,944,830; No. 4,950,350; No. 4,976,803; No. 4,981,547; No. 5,004,518; No. 5,017,261; No. 5,062,917; No. 5,062,918; No. 5,075,123; No. 5,078,826; No. 5,087,317; No. 5,110,402; No. 5,129,984; No. 5,167,755; No. 5,174,851; No. 5,185,053; No. 5,217,538; No. 5,227,005; No. 5,413,153; No. 5,558,138; No. 5,634,500; No. 5,713,403; No. 6,276,113; No. 6,213,169; No. 6,189,578; No. 6,192,946; No. 6,374,575; No. 6,365,054; No. 6,619,016; No. 6,474,368; No. 6,494,238; No. 6,470,922; and No. 6,463,964.

All of the patents, patent applications and publications recited herein, and in the Declaration attached hereto, are hereby incorporated by reference as if set forth in their entirety herein.

Some examples of microprocessors that may possibly be utilized or possibly adapted for use in at least one possible embodiment of the present application may possibly be found in the following U.S. Pat. No. 6,095,987 issued to Shmulewitz et al. on Aug. 1, 2000; No. 6,516,331 issued to Beiu on Feb. 4, 2003; No. 6,522,981 issued to Smit et al. on Feb. 18, 2003; No. 6,539,502 issued to Davidson et al. on Mar. 25, 2003; No. 6,553,460 issued to Chopra et al. on Apr. 22, 2003; No. 6,557,098 issued to Oberman et al. on Apr. 29, 2003; No. 6,571,363 issued to Steiss on May 27, 2003; and No. 6,574,724 issued to Hoyle et al. on Jun. 3, 2003.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some further examples of filtration methods and apparatus that may possibly be utilized or possibly adapted for use in at least one possible embodiment of the present application may possibly be found in the following U.S. Pat. No. 5,141,638 issued to Mori et al. on Aug. 25, 1992; No. 5,384,135 issued to Caluwaerts on Jan. 24, 1995; No. 5,362,387 issued to Saito et al. on Nov. 8, 1994; No. 5,439,699 issued to Tripp et al. on Aug. 8, 2004; No. 6,013,288 issued to Shibano et al. on Jan. 11, 2000; and No. 6,077,428 issued to Oechsle et al. on Jun. 20, 2000.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign patent application publications, namely, Federal Republic of Germany Patent Application No. DE P 103 40 366.3, filed on Sep. 2, 2003, having inventor Hans BECKER, and DE-OS 103 40 366, and DE-PS 103 40 366, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some further examples of filtration methods and apparatus that may possibly be utilized or possibly adapted for use in at least one possible embodiment of the present application may possibly be found in the following Patents of Great Britain: No. 497,543 filed Apr. 27, 1938; No. 996,717 filed Aug. 6, 1963; No. 1,021,331 filed Jan. 1, 1963; No. 1,095,003 filed Feb. 19, 1965; No. 1,401,466 filed on Oct. 10, 1972; and No. 2,190,603 filed May 22, 1987.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

Some further examples of filtration methods and apparatus particularly relating to plate filters and plate filtration that may possibly be utilized or possibly adapted for use in at least one possible embodiment of the present application may possibly be found in the following U.S. Pat. No. 4,065,390 issued to Schneider et al. on Dec. 27, 1977; No. 4,292,173 issued to Parmentier on Sep. 29, 1981; No. 4,329,228 issued to Crowe et al. on May 11, 1982; and No. 4,643,827 issued to Becker on Feb. 17, 1987.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The application in one aspect relates to a filter apparatus having a plurality of filtering regions that are disposed above one another in the direction of a central filter axis and that are disposed essentially horizontally with at least one central distributor conduit 2 being associated with said filtering regions, with at least one common channel 1 for delivering liquid to be filtered (unfiltrate), as well as with at least one common channel 14 for removing filtered liquid (filtrate) being associated with said filtering region and said filter apparatus comprising at least one filter layer that is disposed at a filter element 7, said layer being configured to serve to produce, for the purpose of precoating, at least one precoat layer that is configured by at least one filter aid and said filter layer separating a filtrate collecting space that discharges into the filtrate channel 14, from a sludge compartment that is positioned above the filtrate collecting space, the filter apparatus also comprising for each filter element 7 an annular feed channel 6 that is disposed about the central axis of the filter apparatus said annular feed channel being configured to discharge at an exit opening into the sludge compartment 15 by way of a larger first radial distance from the central filter axis and, by way of a smaller second radial distance from the central filter axis, comprising at least one entrance opening for the liquid to be filtered (unfiltrate), said entrance opening being in communication with the liquid to be filtered (unfiltrate) channel, whereby the exit of the liquid to be filtered (unfiltrate) channel that is surrounded by filtering regions, is provided in the region of the central filter axis, and thereby it is provided that with each filter element 7 and/or a group of filter elements 7 is associated at least one valve apparatus for fluid that is disposed in the exit stream of the filtered liquid.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OR REFERENCE NUMBERS

1 Feed conduit for liquid to be filtered (unfiltrate)
2 Central distributing conduit
2' Passage through 2
2a Inner surface of 2
2b Outer surface of 2
3 Filter
4 Branch conduit, nozzle conduit
4a'-4j' Individual branch conduit, nozzle conduit
4a"-4j" Individual branch conduit, nozzle conduit
5 Filter cake—layer formed by filtering aid
5a-5j Individual filter-aid cake
5' Residue layer
5a'-5j' Individual residue layer
6 Inlet channel or baffle
6a-6j Individual baffle or channel
7 Filter element
7a-7j Individual filter chamber or filter element
8 Slotted sieve tray or screen
8a-8j Individual slotted sieve tray
9 Separating plate
9a-9j Individual separating plate
9a'-9j' Upper surface
9a"-9j" Lower surface
10 Valve apparatus for flushing liquid (FIG. 4)
10a Pump
11 Feed/inlet conduit for flushing liquid (FIG. 4)
11a Pump
12 Exit nozzles (FIG. 4)
13 Filtrate valve, valve apparatus for filtered liquid (FIG. 4)
14 Filtered liquid exit conduit, filtrate exit channel (FIG. 4)
14a Separate passage for flushing liquid (FIG. 5)
14a' First passage for flushing liquid into filter chamber (FIG. 5)
14a" Second passage for flushing liquid into filter chamber (FIG. 5)
15 Sludge compartment
15a-15j Individual sludge compartments
16 Outer wall of filter 3
16a Outer surface of 16
16b Inner surface of 16
17 Conduit between filter chamber 7 and valve arrangement 18
17a-17j Individual conduits
18 Valve arrangement between filter chamber 7 and conduit 14
18a-18j Individual valve arrangement
20 Filter arrangement
21 Filter structure
22 Sensors
31 Conduit portion (FIG. 7)
32 Conduit portion
33 Valve arrangement
34 Conduit portion
35 Upper inlet
36 Conduit portion
37 Valve arrangement
38 Conduit portion
39 Conduit portion
39 Lower inlet
40 Projecting structure
42 Clamping structure
45 Venting passage
100 Beverage bottling plant
101 Rinsing arrangement, rinsing station, rinser
103 Conveyer arrangement to feed bottles to rinsing arrangement
104 Conveyer arrangement to pass bottles to filling machine
105 Beverage filling machine
105' Rotor
106 Closing arrangement, closing station, closer
107 Conveyer arrangement to pass bottles to labeling arrangement
108 Labeling arrangement, labeling station having at least one
109 Conveyer arrangement to convey first product bottles
110 Conveyer arrangement to convey second product bottles
111 Conveyer arrangement to convey incorrectly labeled bottles
112 Central control arrangement, controller, with a computer to process algorithms
112a Connecting lines between 112 and sensors etc.
113 Filling positions
114 Filling arrangement
117 Toroidal vessel
121 Conduit for first product
123 First product mixer or storage
A Direction of travel of bottles (FIG. 8)

$A_D$ Direction of position of flushing channel and filtrate removal channel (FIG. 5)
B Bottle
$H_1$ Height of chamber 7
$H_2$ Height of 4 from 9
$H_3$ Height of 4 from 6
$H_4$ Height of b (filter aid plus residue)
F Direction of cleaning fluid
$F_1$ Flow direction from below in 2
$F_2$ Flow direction from above in 2
$F_3$ Flow behavior of liquid in 7
$F_4$ Flow behavior of liquid in 7
$F_5$ Flow behavior through filter aid 5
G Direction of cleaning fluid
M Central longitudinal axis
a angle
c angle
E0 Plane
E1 Plane
E2 Plane

What is claimed is:

1. A method of filtering with a filter apparatus, said filter apparatus comprising: a plurality of filtering regions disposed essentially horizontally and above one another in the direction of a central filter axis; at least one central distributor conduit being associated with said filtering regions; at least one common channel for delivering unfiltered liquid to be filtered; a pump for pumping said unfiltered liquid; at least one common channel for removing filtered liquid from said filtering regions; and said filter apparatus comprising a filter layer that is disposed at a filter element, said filter layer being configured to serve to produce, for the purpose of precoating, at least one precoat layer, and said filter layer separating a filtrate collecting space that discharges into said filtrate channel from a sludge compartment that is positioned above said filtrate collecting space; said filter apparatus further comprising an annular feed channel disposed about the central axis of said filter apparatus; said annular feed channel comprising: at least one entrance opening for said unfiltered liquid and an exit opening into said sludge compartment, which said exit opening is disposed at a larger first radial distance from the central filter axis, and said at least one entrance opening is disposed at a smaller second radial distance from the central filter axis; a plurality of valve apparatuses being configured and disposed to control the exit stream of filtrate from said filter elements; and each filter element and/or a group of filter elements being associated with a corresponding one of said valve apparatuses, said method comprising:

continuously monitoring, with a computer control unit, a plurality of pressure sensors in said filter apparatus to determine pressure drop of each filter element and/or a group of filter elements; and filtering unfiltered liquid through said filter elements while continuously adjusting the pressure drop in each filter element and/or a group of filter elements so that the pressure drop is substantially the same for each filter element and/or group of filter elements by automatically adjusting, with said computer control unit, said plurality of valve apparatuses, and thereby minimizing energy consumption by said pump and maximizing filtration.

2. The method of filtering with a filter apparatus according to claim 1, wherein said method further comprises closing filtrate valves upon detecting a pressure drop in said filter elements associated with said filter valves to be closed that is higher than an acceptable, predetermined pressure drop.

3. The method of filtering with a filter apparatus according to claim 2, wherein the method comprises filtering beer.

* * * * *